Nov. 6, 1956 E. H. WITTENBERG 2,769,457
COMBINED VENTING AND OVERPRESSURE RELEASE VALVE
Filed June 1, 1953 2 Sheets-Sheet 1
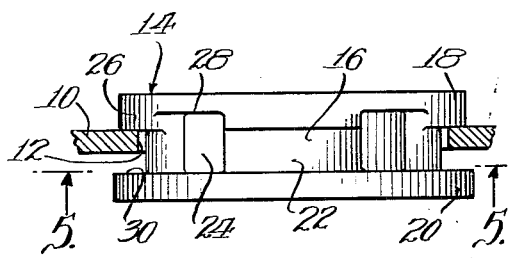
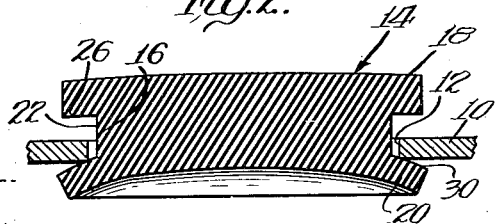
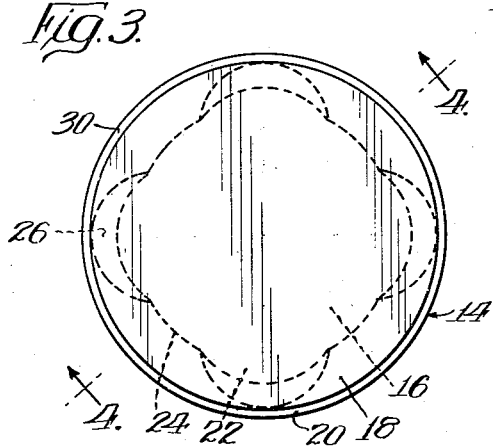
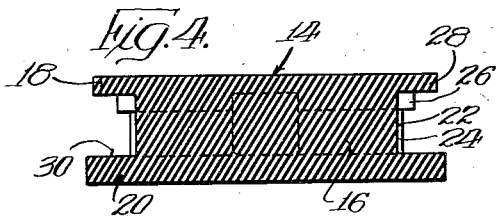
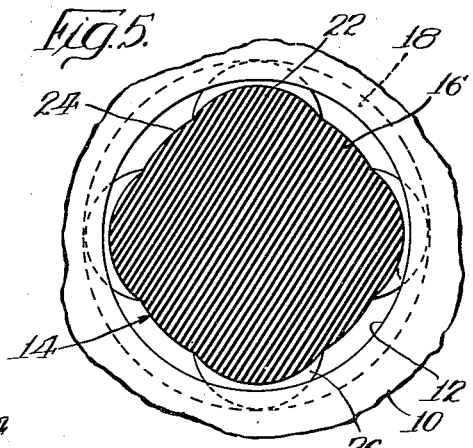
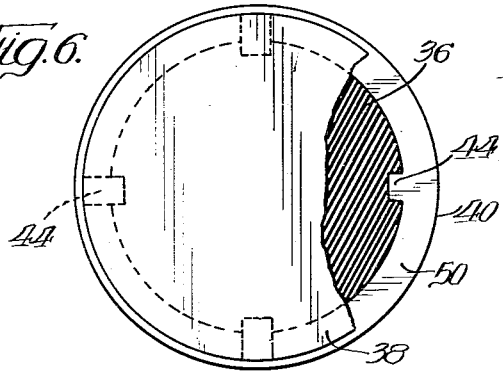
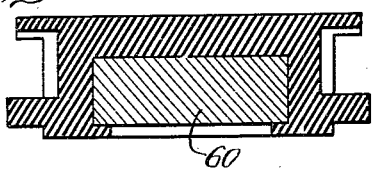
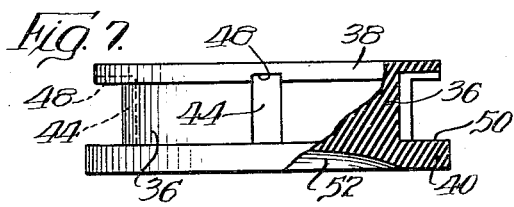
INVENTOR.
Edward H. Wittenberg
BY
Brown, Jackson, Boettcher
and Dienner
Attys.

INVENTOR.
Edward H. Wittenberg
BY
Brown, Jackson, Boettcher & Dienner
Attys.

United States Patent Office 2,769,457
Patented Nov. 6, 1956

2,769,457

COMBINED VENTING AND OVERPRESSURE RELEASE VALVE

Edward H. Wittenberg, La Crosse, Wis., assignor to National Presto Industries Inc., Eau Claire, Wis., a corporation of Wisconsin Application June 1, 1953, Serial No. 358,811

7 Claims. (Cl. 137—512)

The present invention relates to improvements in valve means for pressure vessels and, particularly, to improvements in combined venting, sealing and overpressure release devices or valves for pressure cookers.

In the operation of pressure cookers, certain requirements must be met. First, air must be vented from the cooker before actual cooking can commence, second, the cooker must be sealed to accommodate the build-up of the requisite steam pressure for cooking, and third, safety valve means must be provided to accommodate the relief of dangerous overpressure conditions. Further, as a desirable feature, it would be advisable to incorporate means to prevent the occurrence of a vacuum condition in the cooker, as normally occurs upon cooling of the cooker, so as to accommodate ready removal of the cooker cover. Certain devices and valve means have been proposed heretofore to accomplish, by means of one or more instrumentalities, the three requirements above enumerated. In my prior Patent No. 2,429,149, issued October 14, 1947, I have disclosed a single valve means for accomplishing not only the three requisite functions listed, but for accomplishing the fourth function as well. However, this prior valve means suffers certain disadvantages, particularly in respect of economy, in that special retaining means must be provided in or on the cover to retain the disc in operative position.

It is an object of the present invention to provide valve means of improved construction, operation and economy, accomplishing all of the said four functions, and providing for the extremely economical and convenient association thereof with a pressure vessel.

According to the present invention, the pressure vessel whether it be of thick or thin section, need merely be provided with an aperture therethrough adapted for the reception of the valve means of the invention. No accurate machining operations need be performed and securement of a retainer to the vessel is not required. The valve means of the invention preferably comprises a spool or grommet of resilient material adapted to be inserted in an aperture in a pressure cooker cover, for example, with the central portion of the spool received within the aperture and the two end flanges of the spool disposed to opposite sides of the cover. The central portion of the spool is formed with respect to the aperture to define a vent passage between the spool and the aperture wall. The inner surface of the flange engaging the top side of the cover has an irregular surface to define an air passage communicating with the passage between the central portion of the spool and the aperture wall. The inner surface of the resilient spool flange disposed to the inner or lower side of the cooker cover is smooth and adapted to engage the inner surface of the cover sealingly to close the aperture and said vent passages upon application of pressure to the spool. Upon application of excessive pressure to the spool, the lower resilient flange is adapted to yield to accommodate ejection of the spool from the cover. In the absence of pressure, the lower flange of the spool is spaced from the inner surface of the cover so that communication is established between the interior of the cooker and atmosphere through the passages above defined. Accordingly, in use of the cooker, the valve means of the present invention is adapted to accomplish the four functions stated. In the absence of internal pressure above atmospheric in the cooker, vent passages are established to vent the cooker of air upon initiation of heating and to vent any tendency toward a vacuum condition upon cooling of the cooker. As pressure is created in the cooker, the valve is adapted to seal the vent passages and accommodate the build-up and maintenance of cooking pressures. Should an overpressure condition occur within the cooker, the lower flange of the spool accommodates ejection of the spool from the cover to vent such condition. After ejection, the spool may be readily inserted in the aperture of the cover by forcing one of the flange members thereof through the aperture, thus to again condition the valve for the performance of its four functions.

According to one embodiment of the present invention, the valve member is formed as an imperforate unitary spool of molded rubber or like material. A modification of this embodiment incorporates a weight to provide greater assurance of the air venting function.

A second embodiment of the invention comprises a combination of a spool and a metal valve, the spool being provided with an axial bore within which a metallic valve member is movably mounted, the valve member performing three of the four stated functions and the spool performing the fourth.

In addition to the foregoing, it is an object of the present invention to provide a replacement unit for pressure cookers presently in use, wherein the spool-type valve may not be as readily and economically employed as desired. In this embodiment of the present invention, the metallic valve member described in the preceding paragraph is used in combination with a resilient blow-out disc.

While reference is made herein to utilization of the valve of the invention in a pressure cooker cover, it will be appreciated that the valve may be mounted in any wall of a pressure vessel and is not restricted to use with food cookers.

Other objects and advantages of the present invention will become apparent in the following detailed description of preferred embodiments of the invention, wherein reference is made to the accompanying drawings, in which:

Figure 1 is a side elevation of one embodiment of the valve of the present invention showing the same associated with a wall of a pressure vessel, the vessel wall being partially shown in section;

Figure 2 is a cross sectional view of the valve shown in Figure 1 as associated with a wall of a pressure vessel and showing the valve in the position the same would assume as pressure within the vessel approached the pressure release or blow-off point of the valve;

Figure 3 is a top plan view of the valve;

Figure 4 is a cross sectional view of the valve taken on line 4—4 of Figure 3, the view showing the valve on a different cross sectional plane from that shown in Figure 2;

Figure 5 is a horizontal cross sectional view of the valve as associated with a wall of a pressure vessel, the view being taken substantially on line 5—5 of Figure 1;

Figure 6 is a top-view, partly in plan and partly in section, of a first modification of the embodiment of the invention shown in Figures 1 to 5;

Figure 7 is a side view, partly in section and partly in elevation, of the modification shown in Figure 6;

Figure 8 is a cross sectional view of a further modification of the embodiment of the invention shown in Figures 1 to 5;

Figure 9:
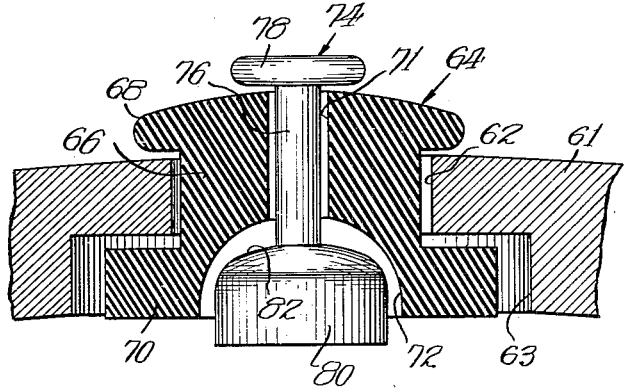
Figure 9 is a cross-sectional view of a second embodiment of the valve of the invention, the view showing the valve associated with a wall of a pressure vessel.

Turning to Figures 1 to 5, I have shown the first embodiment of the valve means of the present invention in Figures 1, 2 and 5 as mounted in a wall 10 of a pressure vessel. The wall 10 is preferably the top wall of the vessel and in pressure cookers is preferably the cooker cover. The wall 10 of the pressure vessel is provided with a circular aperture 12 adapted for the reception of the valve means of the present invention, which is indicated generally at 14. In the first embodiment thereof, the valve means comprises a unitary spool-shaped member or grommet formed of resilient material that is resistant to high temperatures, to food vapors and to greases. The valve member 14 comprises a generally cylindrical central portion or stem 16 and radially extending flanges 18 and 20 at the opposite ends thereof, the flanges 18 and 20 being adapted to be disposed respectively to the exterior and interior of the vessel.

While the body or stem 16 of the valve may present a smooth peripheral surface of a diameter slightly less than the diameter of the aperture 12, it is preferable to provide the portion 16 of the valve member with an irregular peripheral surface comprising a plurality of outwardly extending portions 22 and a plurality of radially recessed portions 24. The outwardly extending portions 22 of the central portion or stem 16 of the valve member are adapted to engage the walls defining the aperture 12 so as to position the valve substantially centrally of the aperture. As shown in the drawings, the outwardly extending portions 22 of the central portion of the valve member may be spaced slightly from the wall defining the aperture 12, but it is preferred that the clearance between the central portion of the valve member and the portions of the cooker cover defining the aperture 12 be relatively slight so as to insure proper positioning of the valve member with respect to the aperture provided in the cooker cover. The top flange 18 of the spool valve 14 may have any desired external surface configuration, but the inner surface thereof, that is the surface facing toward the vessel, is preferably provided with an irregular configuration. In particular, the inner surface of the top flange 18 may be provided with a plurality of axially extending or thickened portions 26 generally aligned with the radially outwardly extending portions 22 of the central portion 16 of the valve member, which results in a plurality of axially recessed portions 28 aligned with the radially recessed portions 24 of the stem or body 16.

In the normal position of the valve, as is shown in Figure 1, the circumferentially spaced recessed portions 24 and 28 of the central portion and the top flange, respectively, of the spool valve are spaced from the surfaces of the wall 10 of the pressure vessel, as is the lower flange 20 of the valve, to provide air passages establishing communication between the interior of the vessel and atmosphere. The lower flange 20 of the spool valve may be of any desired external configuration, but the inner surface 30 thereof, that is the surface facing toward the wall 10 of the pressure vessel, is entirely smooth or regular so as to conform to the inner surface of the wall 10 upon pressure application thereto. The lower flange 20 is preferably of a slightly greater diameter and thickness than the upper flange 18. In accordance with the present invention, it is preferred that the actual distance between the inner surface of the axially extending portions 26 of the top flange 18 and the inner surface 30 of the lower flange 20 be between approximately .015 to .030 inch greater than the thickness of the cover, so as to provide an opening of at least .015 inch between the inner surface 30 of the lower flange 20 and the inner surface of the wall 10 of the pressure vessel when the valve member is in its open position, as is shown in Figure 1, to allow air to pass freely between the interior of the vessel and atmosphere. Accordingly, for different thicknesses of cooker covers, the plugs will vary somewhat in overall length. In production the different lengths of plugs can be readily manufactured merely by changing the central portion of a three piece die for making the spool plugs.

In use, as the pressure cooker is initially heated, the air within the interior of the vessel may be readily vented through the recessed portions 24 and 28 of the stem 16 and the top flange 18, respectively, of the spool valve. As steam is created within the vessel, and the velocity of flow is increased, the inner surface of the top flange 18 and the lower surface of the bottom flange 20 are subjected to increased velocity and pressure so that the valve member is moved upwardly to bring the inner surface 30 of the bottom flange 20 into engagement with the inner surface of the wall 10 of the pressure vessel. Upon increase in pressure, the surface 30 of the lower flange member 20, due to the resiliency of the flange, will be sealingly engaged with the lower surface of the wall 10, despite surface irregularities, to close the aperture 12 in the wall 10 and seal the vessel or pressure cooker for normal operation. In pressure cookers, cooking is normally carried out at pressures of five, ten or fifteen pounds per square inch. Should the vent pipe of the cooker become clogged, or should the pressure gauge of the cooker fail, however, the pressure within the vessel will increase. To prevent the creation of undue or dangerous pressure conditions, the valve of the present invention provides a safety release feature. In this regard, at least the lower flange 20 of the spool or grommet is flexible and is so designed as to be forced through the aperture 12 in the cooker cover 10 upon the occurrence of a predetermined pressure condition within the vessel. As will be apparent, the flange 12 will resiliently flex or distort so as to be blown or forced through the aperture 12 upon the occurrence of a predetermined overpressure condition. For example, the flange 20 may be conveniently designed to be blown through the aperture 12 upon the creation of approximately twenty-five pounds per square inch pressure within the cooker. In Figure 2, I have shown the valve in the position which the same would assume when the pressure within the cooker is slightly below the blow-off or pressure release value or point of the flange 20, which for example, may be approximately twenty-two pounds per square inch.

If, during operation of the cooker, the valve member 14 is blown from the cooker cover, the same may be readily reinserted in the cover by cooling the cooker and manually distorting the valve so as to reinsert the same in the cover by forcing either of the flanges 18 or 20 through the aperture 12. The top flange 18 is preferably smaller and of less thickness than the flange 20 so that the same may be readily forced through the aperture 12 in the cooker cover 10. Since the flange 18 serves only to hold the valve to the cover and need not withstand any particular degree of pressure, the formation of the valve in the manner stated is readily accomplished.

When the normal cooking period has elapsed, the cooker is cooled to reduce the pressure therein. When the pressure within the cooker is reduced to approximately atmospheric pressure, the valve, due to the force of gravity and atmospheric pressure, returns to the position shown in Figure 1, wherein communication is established between atmosphere and the interior of the vessel to prevent the creation of a vacuum condition within the vessel.

From the foregoing, it will be appreciated that the valve member of the present invention performs four functions essential to automatic pressure cooker operation, namely, the automatic venting of air, the automatic sealing of the pressure vessel after the air is vented therefrom, overpressure release and automatic venting to prevent creation of a vacuum condition within the vessel.

A modification of the first embodiment of the present invention, which accomplishes all of the functions of the first embodiment, is shown in Figures 6 and 7, the modification being generally the same as the embodiment described and comprising a spool-type body or grommet formed of resilient material. The spool comprises a generally cylindrical central body portion or stem 36, a top flange 38 and a bottom flange 40. The body portion or stem 36 of the spool is provided at spaced points about the periphery thereof with radially inwardly extending slots 44, which slots are extended axially into the lower surface of the top flange 38, as at 48. As will be apparent, when the valve is in venting position, the circumferentially spaced slots 44 and 48 will readily accommodate venting of the pressure vessel by establishing communication between the interior of the vessel and atmosphere. The lower flange 40 of the spool is provided with a smooth or regular upper or inner surface 50 adapted to engage against the inner surface of the pressure wall sealingly to close the vessel. As is shown in Figure 7, the lower or outer surface of the lower flange 40 may be conveniently provided with a curved or semispherical indentation 52 to provide for accurate sealing of the aperture in the cooker cover and to accommodate flexing of the flange 40 so that the same may be readily blown through the aperture in the pressure vessel wall upon the attainment of a predetermined overpressure condition within the pressure vessel.

The ability of the valve means of the present invention to accommodate venting of air from the cooker during the initial stages of cooker operation is a function of the weight of the valve with respect to the effective area thereof exposed to pressures within the interior of the cooker body during initial operation of the cooker. In view of this factor, it will be appreciated that the valve of the present invention may be designed for performing only the functions of vacuum venting and overpressure release. However, it will also be appreciated that the third function of air venting may readily be accomplished by proper design of the valve with respect to its weight as proportioned to the effective area thereof exposed to pressure in the interior of the cooker when the valve is in its normal position on the cooker cover. In this latter respect, the weight of the valve may be varied according to the particular design thereof and the material from which the valve is made. If desired, however, a weight or the like may be included in the spool or grommet, as is shown in Figure 8, by embedding or otherwise inserting a metallic weight 60 in the body portion of the spool or grommet, to increase the weight and insure accomplishment of the air venting function.

A second embodiment of the present invention is shown in Figure 9, wherein I employ a metallic valve member in combination with a resilient grommet or spool of the general character described hereinbefore. As shown in Figure 9, the valve is adapted for association with a wall 61 of a pressure vessel. The wall 61 is preferably the top wall of the vessel and in pressure cookers is preferably the cooker cover. The wall may be formed of cast thickness and is provided with an aperture 62. In the case of cast thickness of the vessel wall, a counterbore 63 may be provided in the lower surface of the wall, if desired. However, the counterbore is not necessary, nor is it necessary to provide a wall of cast thickness. If desired, the wall may be the same as that indicated at 10 in Figure 1 as described hereinbefore. The aperture 62 and counterbore 63 are adapted for the reception of the spool or resilient grommet portion of the valve means of the present invention, the spool being indicated generally at 64. The spool or grommet 64 comprises a unitary member formed of resilient material that is resistant to high temperatures, to food vapors and to greases. The spool 64 comprises a generally cylindrical central body portion or stem 66 and radially extending flanges 68 and 70 at the opposite ends thereof. The flange 68 is adapted to be disposed to the exterior of the vessel and will be referred to herein as the outer, upper, or top flange of the spool. The flange 70 is adapted to be disposed to the interior of the vessel and will be referred to herein as the inner, lower, or bottom flange of the spool.

The central body portion 66 of the spool or grommet 64 may be formed in the manner described hereinbefore with respect to the spools shown in Figures 1 to 8. However, according to the present embodiment of the invention, it is preferable that the stem 66 of the spool present a smooth peripheral surface of a diameter less than the diameter of the aperture 62. The inner surfaces of the two flanges 68 and 70 may be formed as described with respect to the first embodiment of the invention and its modifications, but according to the present embodiment, the flanges are preferably formed only with the normal surface irregularities resulting from conventional manufacture. Due to the irregularities in the inner surface of the upper flange 68 and the irregularities in the surface of the vessel wall, adequate air passages are provided between the flange 68 and the wall 61 to establish communication between the interior of the vessel and atmosphere. Such passages are indicated in the drawings by an exaggerated spacing of the flange 68 and the cover. Preferably, the upper flange 68 is relatively small and has a rounded peripheral edge to facilitate insertion of the spool in the vessel wall. As described hereinbefore, the flanges of the spool are spaced apart by a distance greater than the thickness of that portion of the wall through which the spool extends. In other words, the body or stem of the spool is of a length greater than the thickness of the portion of the wall in which the aperture is formed.

The spool or grommet 64 differs from that described hereinbefore in that the same includes an axial bore 71 opening into a generally concave or hemispherical recess 72 in the lower side of the spool. A metallic valve member 74 is adapted to be inserted in the bore 71 for a purpose to be described hereinafter. The valve 74 includes a stem or body 76 received in the bore 71, an upper radial flange 78 and a lower radial flange portion 80. Generally then, the valve 74 is also a spool. The stem 76 of the valve 74 is of a smaller diameter than the bore 71 so as to provide an air passage between the stem 76 and the resilient spool 64, and the stem 76 is a length greater than that of the bore 71 so that the metal valve member is movable with respect to the spool. The upper flange 78 of the metal valve 74 is relatively small, the same being only large enough to retain the valve 74 in the spool 64 as is shown in Figure 9. The inner surface of the upper flange 78 need not be finished in any special manner, and preferably is not accurately finished to a smooth surface. Thus, the normal surface irregularities of the flange 78 and the upper flange 68 of the spool 64 will define air passages communicating with the bore 71. For purposes of showing the air passages thus provided, the drawings have been exaggerated to show the flange 78 of the valve 74 spaced from the flange 68 of the spool 64. In actual use, the flange 78 rests on the flange 68. The lower flange portion 80 of the metal valve member 74 comprises a weight for controlling valve operation, much like the weight 60 in the modification of Figure 8. The weight or flange portion 80 presents an arcuate upper surface, that is a convex or generally hemispherical surface portion 82 adapted to mate with the recess 72 in the spool 64, the surface of the recess defining a valve seat for the surface 82 of the weight 80.

In use, the valve means is adapted to be associated with a pressure cooker cover in the manner shown and described. When the cooker is first set in operation, the apparatus will be disposed as shown in Figure 9 wherein air passages are provided between the lower flange 70, the central portion 66 and the upper flange 68 of the spool 64 and the adjacent surfaces of the cover 61, and between the lower flange 80, the stem 76 and the upper flange 78 of the valve 74 and the adjacent surfaces of the spool 64. As the liquid in the vessel is heated, the air will be vented from the cooker through the aforesaid passages to atmosphere until steam is generated and a certain pressure and rate of flow are attained, at which time the spool 64 will be moved upwardly to bring the inner or upper surface of the lower flange 70 into engagement with the inner surface of the cooker cover. In this position, air venting is still accommodated by the valve 74. Thereafter, as the pressure and rate of flow increase further, the metal valve member will be acted upon to be moved upwardly to bring the convex surface 82 of the weight 80 into engagement with its seat 82. The vessel in effect is now closed, but not sealed. As pressure now builds up in the cooker, the resilient flange 70 of the spool 64 is biased and resiliently distorted into sealing engagement with the lower surface of the cover, after which the weight 80 is forced into sealing engagement with the spool 64, the spool distorting resiliently to effect the seal. Thus, the weight or metal valve member determines the responsiveness of the valve to pressure in the vessel. Cooker operation may then proceed in a conventional manner, at five, ten or fifteen pounds per square inch as desired.

Should the pressure within the cooker body exceed a predetermined maximum, such as the twenty-five pounds per square inch limit referred to hereinbefore, the lower flange 70 of the spool, which is flexible and resilient, will be forced through the aperture 62 in the cover 61 to vent the overpressure condition. Thus, the embodiment of the valve shown in Figure 9 provides overpressure relief in the same manner as the spools described hereinbefore. After the cooker has cooled, the valve may be reinserted in the cover by removing the cover from the cooker body and pushing the upper flange 68 of the spool 64 through the aperture 62. Due to the relatively small dimensions and the rounded peripheral edge thereof, the flange 68 is easily pushed through the aperture.

When cooking has been completed, the cooker will be cooled to reduce the pressure therein. As the internal pressure approaches atmospheric, the metal valve member 74 will gravitate downwardly to free the weight 80 from its seat. The air passages between the valve 74 and the spool 64 are thus opened to prevent the occurrence of a vacuum condition in the cooker. After the valve 74 is open, and at a slightly lower internal pressure, the spool 64 will gravitate downwardly to open the air venting passages provided between the spool and the vessel wall. Thus, the creation of a vacuum condition is prevented.

From the foregoing, it will be appreciated that the spool 64 of the present embodiment of the invention performs the same four functions and in substantially the same manner as the spools of Figures 1 to 8, and that the metallic valve member 74 assists in or duplicates the air venting, pressure sealing and vacuum venting functions of the spool.

As will be obvious, the valve members described hereinbefore may be associated with any pressure vessel wall having an aperture therein, either as original equipment or as a replacement valve unit. However, there are a great many pressure cookers presently in use wherein disc type overpressure plugs have been employed, and, it is advisable to retain the disc formation when replacing the plug. By forming the disc with a central aperture therein, association of a valve similar to the metallic valve 74 shown in Figure 9 with the disc is accommodated, whereby the four functions of the valve means of the present invention are provided.

Figure 10:
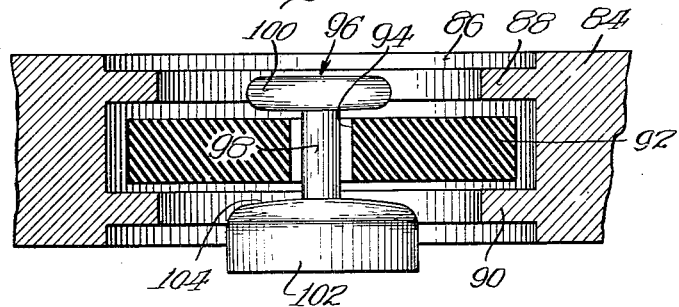
Figure 10 is a view similar to Figure 9 of an embodiment of the invention particularly adapted for use as a replacement unit.

Specifically, I have shown in Figure 10 a conventional cooker cover construction wherein the cover or vessel wall 84 is provided with an aperture 86, the aperture being of irregular configuration and presenting a pair of spaced radially inwardly extending flanges 88 and 90. The flanges 88 and 90 are adapted for the reception therebetween of a resilient disc, such as that indicated generally at 92. In conventional constructions, the disc 92 is a solid disc formed of resilient material adapted to fit tightly within the aperture 86 between the flanges 88 and 90. As shown in Figure 10, the disc 92 has been revamped to accomplish the functions and operational characteristics of the embodiment of the valve means of the present invention shown in Figure 9.

According to the present invention, the disc 92 comprises an annular washer having a central bore 94 therethrough. The disc is of a diameter smaller than the diameter of the aperture 86 in the cover 84 and of a thickness less than the spacing between the flanges 88 and 90 so that the disc is a loose fit to provide generally the characteristics of the spool 64 shown in Figure 9. In particular, some air passages will be provided between the lower surface of the disc 92 and the upper surface of the flange 90 due to surface irregularities to provide an air venting function, the air being vented between the disc 92, and between the upper surface of the disc 92 and the upper flange 88.

The central bore in the disc 92 is adapted for the reception of a generally spool-shaped metallic valve member 96 which comprises a stem 98 loosely positioned in the bore 92, an upper radial flange 100 and a lower radial flange portion 102, the flanges 100 and 102 being disposed to opposite sides of the disc 92. Generally, the valve 96 is designed with respect to the disc 92 in the same manner as the valve 74 is designed with respect to the spool 64 in the embodiment of the invention shown in Figure 9, the only particular difference residing in the fact that the disc 92 presents a flat bottom surface adapted to be engaged by the arcuate or convex upper surface 104 of the weight or flange portion 102 of the valve member.

In use, the operation of the embodiment of the invention shown in Figure 10 is substantially the same as that of the embodiment of the invention shown in Figure 9. In particular, as the pressure cooker is set in operation, air will be vented from the interior of the vessel through the passages provided between the disc 92 and the cooker cover 84 and through the passages provided between the metallic valve member 96 and the disc 92. For purposes of convenient disclosure of the air passages provided by the surface irregularities of the flange 90, the disc 92 and the flange 100, these members have been shown in slightly spaced relation. In actual use, the disc 98 rests on the flange 90 and the flange 100 rests on the disc 92. As steam is generated and the pressure and rate of flow reach a certain value, the disc 92 will be moved upwardly to bring the upper surface thereof into engagement with the lower surface of the flange 88. Thereafter, as the pressure and rate of flow increase further, the valve member 96 will be moved upwardly to bring the convex surface 104 of the weight 102 into engagement with the lower surface of the disc 92 to close the bore 94 in the disc. As pressure builds up within the interior of the vessel, the disc 92 is first forced into resilient sealing engagement with the lower surface of the flange 88 of the cooker cover and the weight 102 of the valve member 96 is then moved into resilient sealing engagement with the lower surface of the disc 92 to seal the pressure cooker. Should an over-pressure condition occur, the disc 92 will be blown from the aperture 86 in the cooker cover 84 in a conventional manner. Reinsertion of the disc 92 in the cover is readily effected in the obvious manner. When cooking is completed and the vessel is cooled, the disc 92 and valve 96 will gravitate downwardly to the normal position shown in Figure 10, wherein air passages are provided between the interior of the vessel and atmosphere to prevent the creation of a vacuum condition within the interior of the vessel.

From the foregoing, it will be appreciated that all embodiments of the valve means of the present invention are adapted to perform four functions essential to automatic pressure cooker operation, namely, the automatic venting of air, the automatic sealing of the pressure vessel after the air is vented therefrom, overpressure release, and automatic venting to prevent creation of a vacuum condition within the vessel. Thus, the valve means of the present invention insures completely automatic operation of pressure cookers in a highly convenient and economical manner.

While I have described what I regard to be preferred embodiments of my invention, it will be appreciated that various changes and modifications may be made therein without departing from the scope of the invention, as defined by the appended claims.

I claim:

1. A combined air and vacuum venting and over-pressure release valve for pressure cookers having an aperture in the cover thereof, comprising a unitary spool of resilient material including a generally cylindrical body portion and a generally circular flexible flange of a size larger than the aperture in the cooker cover extending radially outwardly from said body at each end thereof, said body having a mean diameter less than that of the aperture in the cooker cover and being movably inserted therein and defining air passages between said body and the aperture wall, one of said flanges being disposed to the exterior of the cover, the inner surface of said one flange being irregular and defining as the same rests on the cooker cover air passages communicating with the air passages between said body and the aperture wall, the other of said flanges being disposed to the interior of the cover and having an inner surface to be forced into sealing engagement with the inner surface of the cover, the distance between the inner surface of said one flange and the inner surface of said other flange being greater than the thickness of the cover, said flanges defining normal limits of movement of said spool with respect to the cover, said one flange at the inner limit of movement of said spool engaging the exterior surface of the cover, said other flange being spaced from the interior surface of the cover, said one flange and said body defining a vent passage through the aperture between the interior of the cooker and atmosphere, whereby venting of air from and venting of vacuum conditions in the cooker is accommodated in the inner position of said spool, said other flange at the outer limit of movement of said spool engaging the interior surface of the cover and being responsive to a predetermined range of pressures within the cooker sealingly to engage the interior surface of the cover, whereby the cooker is sealed to accommodate pressure build-up therein, the periphery of said body in all positions of said spool being spaced from the aperture wall to accommodate flexing of said other flange, said other flange being of a size in relation to its flexibility to be flexed upon attainment of a predetermined maximum pressure in the cooker and thereupon to be ejected and effect ejection of said spool entirely from the aperture in the cooker cover in response to the pressure exerted on the inner surfaces of said spool rapidly to vent the cooker of overpressure conditions.

2. A combined venting and over-pressure release valve for pressure cookers having an aperture in the cover thereof, comprising a resilient spool including a body portion of a size smaller than the aperture to be movably received in the aperture and a pair of flanges of a size larger than the aperture extending outwardly from the opposite ends of said body portion to be disposed to the opposite sides of the cover, said body portion being of a length between said flanges greater than the thickness of the portion of the cover within which the aperture is formed, said flanges defining normal limits of movement of said spool with respect to the cover, the peripheral surface of said body portion being spaced from the aperture wall in all positions of said spool, the flange to be disposed to the exterior of the cover having an irregular inner surface defining, at the inner limit of movement of said spool wherein said flange rests on the cover, air passages between said flange and the cover communicating with the space between said body portion and the aperture wall, the flange to be disposed to the interior of the cover being spaced from the inner surface of the cover at the inner limit of movement of said spool, the last-named flange being flexible and responsive to a predetermined range of pressures in the cooker to move said spool to its normal outer limit of movement and to force the inner surface of said flange into sealing engagement with the inner surface of the cover, said last-named flange being flexible and responsive to pressures in the cooker in excess of a predetermined maximum to be flexed and ejected from the cooker cover, the spacing of the peripheral surface of said body portion from the aperture wall accommodating said flexing.

3. A combined venting and over-pressure release valve as set forth in claim 2, wherein said flange to be disposed to the exterior of the cover has a plurality of circumferentially spaced inwardly and axially extending portions on the inner surface thereof to engage normally the exterior surface of the cooker cover, said portions defining therebetween said air passages, said body portion having a plurality of circumferentially spaced radially extending portions of less radial extent than said flanges aligned generally with said axially extending portions on said flange to be disposed to the exterior of the cover, the radially extending portions on said body portion tending to center said spool in the aperture, the flange to be disposed to the interior of the cover having a smooth inner surface to be forced into sealing engagement with the inner surface of the cover.

4. A combined venting and over-pressure release valve as set forth in claim 2, including a weight carried by said body portion determining the responsiveness of the valve to pressure conditions in the cooker.

5. A combined venting and over-pressure release valve for pressure cookers having an aperture in the cover thereof, comprising a resilient member movably mounted in the aperture in the cover, said member having portions cooperating with the cover normally obstructing removal of said member from the cover and defining normal limits of movement of said member with respect to the cover, said member including an exteriorly facing surface normally spaced inwardly from an interiorly facing surface of the cover and an interiorly facing surface normally resting on an exteriorly facing surface of the cover, the periphery of the part of said member received within the aperture being spaced from the aperture wall in all positions of said member, said interiorly facing surface of said member being irregular and defining air passages between itself and the surface of the cover on which it normally rests, said air passages communicating with the space between the periphery of said part of said member and the aparture wall and the space between said exteriorly facing surface of said member and the said interiorly facing surface of the cover normally to vent the interior of the cooker to atmosphere around the exterior of said resilient member, said resilient member having a bore therethrough, and a valve member movably mounted on said resilient member, said valve member comprising a stem movably received in said bore in said resilient member and a pair of flanges extending outwardly from said stem at the opposite ends of said bore, the distance between the inner surfaces of said flanges being greater than the length of said bore, one of said flanges being disposed to the exterior of the cover and normally resting on said resilient member, said valve member in its normal position on said resilient member defining passages establishing communication between the interior and exterior of the cooker, said resilient member and said valve member being responsive to a predetermined range of pressures in the cooker to be moved upon occurrence of such pressures toward the exterior of the cooker, the inner surface of the other of said flanges being forced into sealing engagement with an interior surface of said resilient member and said exteriorly facing surface of said resilient member being forced into sealing engagement with the said interiorly facing surface of the cover throughout said predetermined range of pressures to seal the cooker, said portions of said resilient member being flexible to be ejected and effect ejection of the entire valve from the cover upon attainment of a predetermined maximum pressure in the cooker fully to open the aperture in the cover rapidly to vent over-pressure conditions.

6. A combined venting and overpressure release valve for pressure cookers having an aperture in the cover thereof, comprising a resilient member movably mounted in the aperture in the cover, said member having portions cooperating with the cover normally obstructing removal of said member from the cover and defining normal limits of movement of said member with respect to the cover, said member including an exteriorly facing surface normally spaced inwardly from an interiorly facing surface of the cover and an interiorly facing surface normally resting on an exteriorly facing surface of the cover, the periphery of the part of said member received within the aperture being spaced from the aperture wall in all positions of said member, said interiorly facing surface of said member being irregular and defining air passages between itself and the surface of the cover on which it normally rests, said air passages communicating with the space between the periphery of said member and the aperture wall and the space between said exteriorly facing surface of said member and the said interiorly facing surface of the cover normally to vent the interior of the cover to atmosphere around the exterior of said resilient member, said resilient member having a bore therethrough, and a valve member movably mounted on said resilient member, said valve member comprising a stem of a cross sectional area less than that of said bore and a pair of outwardly extending flanges of a diameter greater than that of said bore, the distance between the inner surfaces of said flanges being greater than the length of said bore, said stem being loosely received in said bore and being spaced from the wall of said bore, said flanges overlying portions of said resilient member at the opposite ends of said bore and defining limits of movement of said valve member with respect to said resilient member, one of said flanges being disposed to the exterior of the cover and normally resting on an exterior surface of said resilient member, said one flange having an irregular inner surface defining air passages between said surface and the exterior surface of said resilient member communicating with the space between said stem and said resilient member when said one flange engages said resilient member to establish communication between the interior and exterior of the cooker through said bore, said resilient member and said valve member being responsive to a predetermined range of pressures in the cooker to be moved upon occurrence of such pressures toward the exterior of the cooker, the inner surface of the other of said flanges of said valve member being forced into sealing engagement with an interior surface of said resilient member and said exteriorly facing surface of said resilient member being forced into sealing engagement with the said interiorly facing surface of the cover throughout said predetermined range of pressures to seal the cooker, said portions of said resilient member being flexible to be ejected and effect ejection of the entire valve from the cover upon attainment of a predetermined maximum pressure in the cooker fully to open the aperture in the cover rapidly to vent overpressure conditions.

7. A combined venting and overpressure release valve for pressure cookers having an aperture in the cover thereof, comprising a unitary spool of resilient material including a generally cylindrical body portion and a generally circular flexible flange of a size larger than the aperture in the cooker cover extending radially outwardly of said body at each end thereof, said body having a mean diameter less than that of the aperture in the cooker cover and being adapted to be inserted therein, one of said flanges being adapted to be disposed to the exterior of the cover, the surface irregularities of the inner surface of said one flange as the same rests on the cooker cover defining air passages communicating with the space between said body and the portions of the cooker cover around the aperture, the other of said flanges being adapted to be disposed to the interior of the cover and having an inner surface adapted to be forced into sealing engagement with the inner surface of the cover, the distance between the inner surface of said one flange and the inner surface of said other flange being greater than the thickness of the cover, said other flange being adapted to flex upon attainment of a predetermined pressure in the cooker to accommodate passage of the valve through the aperture due to the pressure exertion thereon, said spool having an aperture therethrough, and a valve member movably mounted on said spool, said valve member comprising a stem loosely fitted in said aperture of a length greater than said aperture and of a cross-sectional area less than that of said aperture and a pair of outwardly extending flanges disposed at opposite ends of said stem, said flanges defining limits of movement of said valve member with respect to said spool, one of said flanges being adapted to be disposed to the exterior of the cover and being relatively small, the surface irregularities of the inner surface of said one flange and the surface of said spool defining air passages therebetween communicating with the space between said stem and said spool when said one flange engages said spool to establish communication between the interior and exterior of the cooker, said other flange being relatively large and defining a weight for determining the responsiveness of the valve to pressure conditions within the cooker, said other flange being adapted to be forced into sealing engagement with said spool.

References Cited in the file of this patent

UNITED STATES PATENTS

| Number | Name | Date |
|---|---|---|
| 727,244 | Wilkinson | May 5, 1903 |
| 751,667 | Michael | Feb. 9, 1904 |
| 943,951 | Moody | Dec. 21, 1909 |
| 1,032,032 | Staunton | July 9, 1912 |
| 1,997,365 | Howard | Apr. 9, 1935 |
| 2,619,982 | Turner | Dec. 2, 1952 |
| 2,702,046 | Zimmer | Feb. 15, 1955 |